US 6,735,420 B2

(12) United States Patent
Baldwin

(10) Patent No.: US 6,735,420 B2
(45) Date of Patent: May 11, 2004

(54) TRANSMIT POWER CONTROL FOR MULTIPLE RATE WIRELESS COMMUNICATIONS

(75) Inventor: Keith R. Baldwin, Melbourne Beach, FL (US)

(73) Assignee: GlobespanVirata, Inc., Red Bank, NJ (US)

( * ) Notice: Subject to any disclaimer, the term of this patent is extended or adjusted under 35 U.S.C. 154(b) by 273 days.

(21) Appl. No.: 10/024,949

(22) Filed: Dec. 18, 2001

(65) Prior Publication Data

US 2003/0114127 A1 Jun. 19, 2003

(51) Int. Cl.[7] .......................... H04Q 11/12; H04B 17/00
(52) U.S. Cl. .................. 455/127.2; 455/115.1; 455/126; 455/522
(58) Field of Search .................. 455/69, 127.1, 455/127.2, 232.1, 245.1, 522, 115.1, 115.3, 115.4, 126; 375/297, 298, 300, 308

(56) References Cited

U.S. PATENT DOCUMENTS

| 5,128,629 | A | * | 7/1992 | Trinh | 455/127.2 |
| 6,118,988 | A | * | 9/2000 | Choi | 455/115.1 |
| 6,259,682 | B1 | * | 7/2001 | Brown et al. | 455/522 |
| 6,311,047 | B1 | | 10/2001 | Gotou | |
| 6,370,364 | B1 | * | 4/2002 | Liimatainen | 455/126 |

FOREIGN PATENT DOCUMENTS

WO    WO 00/25445 A    5/2000

OTHER PUBLICATIONS

Kandukuri S. et al., "Simultaneous Rate and Power Control in Multirate Multimedia CDMA Systems," IEEE 6th Int. Symp. On Spread–Spectrum Tech. & Appli., Sep. 6–8, 2000, XP010516643, NJIT, New Jersey, USA.

Seong–Jun Oh, et al., "Distributed Power Control and Spreading Gain Allocation in CDMA Data Networks," INFOCOM 2000. Nineteenth Annual Joint Conference of the IEEE Computer and Communications Societies. Proceedings. IEEE Tel Aviv, Israel, Mar. 26–30, 2000, Piscataway, NJ, USA, Mar. 26, 2000, pp. 379–385, XP010376125, ISBN: 0–7803–5880–5.

PCT Notification of Transmittal of the International Search Report or the Declaration dated Mar. 25, 2003, 5 pages.

* cited by examiner

Primary Examiner—Quochien B. Vuong
(74) Attorney, Agent, or Firm—Gary R. Stanford

(57) ABSTRACT

An RF device including a control loop for maximizing output power for each of several data rates or constellation types. The RF device includes a power detector, a power amplifier and a MAC that includes input and output adjust circuits. A power level value is generated from measured output power. The MAC compares an adjusted power level value with a set point value and generates an error value. The MAC adjusts a power control value based on the error value for controlling the gain of the power amplifier. The MAC uses a data rate signal indicative of a selected constellation type or data rate. The input adjust circuit stores one or more input adjustment values selected by the data select signal for adjusting the power level value. The output adjust circuit stores one or more output adjustment values selected by the data select signal for adjusting the power control value.

27 Claims, 3 Drawing Sheets

TRANSMIT POWER CONTROL FOR MULTIPLE RATE WIRELESS COMMUNICATIONS

FIELD OF THE INVENTION

The present invention relates to wireless communications, and more particularly to an efficient multiple data rate, closed-loop transmit power scheme for wireless packet communications.

DESCRIPTION OF RELATED ART

The data rate of wireless data communications, including Wireless Local Area Networks (WLANs) and associated devices, continue to increase. Methods of increasing data rate includes different coding schemes and higher capacity modulation schemes. Exemplary modulation schemes include Binary Phase Shift Keying (BPSK), Quadrature PSK (QPSK), 16 Quadrature Amplitude Modulation (QAM), and 64 QAM employing corresponding constellation types with 2, 4, 16 or 64 constellation points, respectively, for modulating 1, 2, 4 or 6 bits, respectively. BPSK uses a relatively low capacity constellation type whereas 64 QAM uses a relatively high capacity constellation type. The Institute of Electrical and Electronics Engineers, Inc. (IEEE) 802.11a standard employs the BPSK, QPSK, 16 QAM and 64 QAM modulation schemes for WLAN operation in the 5 Gigahertz (GHz) frequency band to achieve data rates of 6, 9, 12, 18, 24, 36, 48 and 54 megabits per second (Mbps) employing orthogonal frequency division multiplexing (OFDM).

OFDM is a multi-carrier modulation technique in which data is carried on a plurality of "tones" or "sub-carriers" associated with a multi-carrier signal. In the OFDM embodiment, communication is established using packets of information including one or more synchronization data fields followed by a plurality of OFDM symbols. In an OFDM configuration, 52 sub-carrier signals are incorporated within each OFDM symbol, including 48 data tones and 4 pilot tones as known to those skilled in the art. Data is incorporated on each data tone using a selected modulation schemes, such as BPSK, QPSK, 16 QAM, and 64 QAM. Each of the modulation schemes employs a corresponding constellation type with 2, 4, 16 or 64 constellation points, respectively, for modulating 1, 2, 4 or 6 bits, respectively. The data rate range is determined by the decoding scheme and by the modulation scheme and corresponding constellation typeused. For example, BPSK is used for 6 or 9 Mbps, QPSK is used for 12 or 18 Mbps, 16 QAM is used for 24 or 36 Mbps, and 64 QAM is used for 48 or 54 Mbps. A constellation point is selected for each bit group according to the selected constellation and data rate, and each tone is modulated with an amplitude and phase according to the selected constellation point. A different data rate may be achieved for each constellation type using a different encoding technique employing different proportions of redundant information. Although the present invention is illustrated using 5 GHz OFDM, it is understood that different RF bands and modulation schemes may be used.

Increases in required transmit power is a necessary consequence of increased path loss in the 5 GHz band. With increased path loss, coverage (communications distance) is at a premium. In order to maximize distance, it is desired to push the transmit power amplifier to a maximum power limit for optimal performance. A given wireless network may be operated at multiple data rates. An Access Point (AP), for example, may communicate with several devices in a wireless area, where each device operates at a different data rate. In fact, an IEEE 802.11a OFDM-based WLAN requires transmission at multiple data rates. Maximum transmit power, however, is a function of the particular data rate of transmission, which is further related to the encoding scheme and constellation type. As the data rate increases, distortion tolerance decreases. For example, the simpler constellations (e.g. BPSK) used in the lower data rates may be transmitted with greater power, albeit higher distortion. As the constellation type becomes more complex, the distance between constellation points decreases (and the corresponding transmit waveform becomes more complex). Distortion tolerance is consequently reduced. Also, a higher data rate for a given constellation type using less redundancy information is more sensitive to distortion and therefore less robust. Because lower data rates can sustain more distortion, they can be transmitted with greater total power.

In this manner, to increase output power (range), it is desired to transmit with as much distortion as possible. On the other hand, in order to prevent serious distortions and spectral leakage into adjacent channels, the power amplifier output should be reduced to limit the effect of waveform peak saturation. As a result of these competing considerations, the target power level is different for each data rate and/or constellation type employed. The problem arises as to how to efficiently maintain closed-loop power control in a radio (such as an AP or the like) that transmits multiple data rate packets at multiple output power levels. Two primary means of automatic level control (ALC) control are available, including an open loop method and a closed loop method. In the open loop method, a control device, such as a media access control (MAC) device or the like, simply writes a default controlling set point value to a register. The controlling set point value may be determined at time of manufacture using a calibration procedure. The use of default values carry the penalty of being less than optimal since conservative assumptions must be made. Differences from channel to channel are less likely to be a problem and can be minimized by interpolation. A more severe concern is that the radio may drift over time causing significant distortion and errors. Without closed loop control, unconstrained power drifts may cause spectral violations and bleed-over into adjacent channels thereby interfering with other users.

In the closed loop method, the control device initially sets a nominal set point value and closes the loop by sampling the output transmit power and driving it to the desired set point. The power amplifier, however, is a non-linear device. The efficiency, distortion, nonlinearity and interference issues dictate a different set point for each data rate or modulation scheme used. In this manner, a single control loop is insufficient to achieve the optimal power set point for each constellation type or data rate and separate loops would otherwise be required. Separate control loops contribute to the complexity and cost of radio devices. Furthermore, certain data rates may only be used infrequently so that significant drift may lead to significant error over time. In other words, infrequently used loops exhibit significant errors and inefficient operation.

SUMMARY OF THE INVENTION

A power controller according to an embodiment of the present invention is used for a wireless transmitter that operates using multiple constellation types to achieve several different data rates, where the transmitter includes a variable output power amplifier having a gain input for controlling output power. The power controller includes an output power detector, an error circuit and a power control circuit. The output power detector provides an output power level value indicative of output power. The error circuit compares the output power level value with a target power value and asserts an error value indicative thereof. The power control circuit asserts a power control signal based on a power control value for controlling the gain input of the output power amplifier, where the power control circuit regulates the power control value based on the error value. In order to maximize or otherwise optimize operation for each of the multiple data rates, the power controller further includes an input normalization circuit that selectively offsets the output power level value using one or more input scale values selected by a data rate select signal. Also, the power controller includes an output normalization circuit that selectively offsets the power control value using one or more output scale values selected by the data rate select signal.

It is appreciated that typical power amplifier used for wireless communications is a nonlinear device. Also, the maximum power level achievable for each data rate is different since based on either maximal spectral leakage or distortion metrics. Nonetheless, it is desired to maximize output power for each data rate to maximize range and operating efficiency. Lower data rates using less complex constellation types and/or encoding techniques are more tolerant of distortion, so that the radio may be operated at higher power levels with increased distortion although within spectral leakage interference metrics. Higher data rates using more complex constellation types and/or encoding schemes are less tolerant to distortion and more likely to be power-limited based on maximum allowable distortion levels. A power controller as described herein employs a single loop with separate input and output correction factors for each data rate or constellation type to maximize output power for all data rates using the same output power amplifier. Correction applied in the loop for any one data rate applies to all other data rates so that all packets contribute to loop adaptation.

The target power level may be based on a first data rate or constellation type. If so, the corresponding input and output scale values are both zero. Such configuration provides greater efficiency since correction factors are not necessary for the first or nominal data rate or constellation type. Alternatively, the target power level is arbitrarily determined and correction factors are used for each constellation type.

The input and output normalization circuits may offset the output power level value or the power control value, respectively, based on a selected one of a plurality of input or output scale values, respectively. Each scale value corresponds to one of the plurality of data rates. In one embodiment, the data rates are achieved using multiple modulation schemes, including BPSK, QPSK, QAM 16 and QAM 64. The input normalization circuit may include a first memory that stores a plurality of input scale values and a first summing junction that combines the output power level value with one of the plurality of input scale values as selected by the data rate select signal. Also, the output normalization circuit may include a second memory that stores a plurality of output scale values and a second summing junction that combines the power control value with a selected one of the plurality of output scale values as selected by the data rate select signal.

In more specific embodiments, the output power detector may include an average circuit that measures and averages a plurality of output power level samples to generate an averaged output power level value. The power control circuit may further include a single loop accumulator that adjusts the power control value by the error value for each data rate or constellation type. Also, the input and output scale values may correspond to constellation types rather than specific data rates. A loop regulator may be provided to scale the error value by a predetermined amount to control loop convergence timing.

The present disclosure describes a radio frequency (RF) communication device that includes a power control loop for controlling output power for each data rate or constellation type. The RF communication device includes an output portion, a Baseband processor and a control device, where the control device further includes input and output normalization adjust circuits. The output portion includes a power detector and a variable output power amplifier having a gain input. The Baseband processor receives a power level signal from the power detector and provides a corresponding power level value. The Baseband processor also receives a power control value and asserts a power control signal to the gain input of the variable output power amplifier. The Baseband processor may include an averaging circuit that samples the power level signal a plurality of times and that averages the samples.

The control device receives and compares an adjusted power level value with a predetermined set point value and generates a corresponding error value and adjusts the power control value based on the error value. The control device uses a data rate signal indicative of a selected data rate or constellation type. The input normalization adjust circuit includes a first memory that stores one or more input adjustment values selected by the data select signal for adjusting the power level value. The output normalization adjust circuit includes a second memory that stores one or more output adjustment values selected by the data select signal for adjusting the power control value.

The set point value may be based on a first (or nominal) data rate or constellation type so that a corresponding pair of input and output adjustment values are zero. The first and second memories may store a plurality of input and output adjustment values, where each pair of input and output adjustment values is employed to maximize output power when operating at corresponding data rates. The first and second memories may each comprises a plurality of programmable registers.

The control device may be implemented in any appropriate manner to achieve the desired results. For example, the control device may include a first summing junction that adds a power level value with a selected input adjustment value to provide an adjusted power level value, and a second summing junction that compares the adjusted power level value with the set point value to generate the error value. The control device may include a loop regulator that scales the error value to control convergence timing of the power control loop. The control device may include an accumulator that stores the power control value and a third summing junction that adjusts the power control value in the accumulator by the scaled error value. The control device may further include a fourth summing junction that adds the adjusted power control value from the accumulator and a selected output adjustment value and that provides an adjusted power control value. The control device may include a third memory that stores an initial power control value that is copied into the accumulator upon power up or reset. The initial power control value may be based on a percentage of a measured power control value that achieves a maximum power level for a nominal constellation type. The control device may be a media access control (MAC) device.

The present disclosure describes a method of calibrating a radio frequency (RF) transmitter to maximize output power for each of a plurality of data rates or constellation types. The RF transmitter may use different constellation types and/or encoding schemes to achieve multiple data rates. In any case, the RF transmitter includes a single power control loop that converges using a target power set point in a first memory during normal operation that is used for all data rates or constellation types. The RF transmitter further includes a second memory for storing a plurality of output scale factors used to adjust a power control value and a third memory for storing a plurality of input scale factors used to adjust a power level value. The input and output scale factors are selected by a data rate signal indicative of data rate or constellation type.

The method includes opening the control loop during calibration, operating the RF transmitter using a selected first data rate or constellation type while measuring output power metrics including a spectral leakage metric and a distortion metric, applying and adjusting a power control value at an input of the opened control loop until a maximum desired power level is achieved for the data rate or constellation type when either one of the spectral leakage metric and the distortion metric is maximized (resulting in a first power control value), storing a power level value at an output of the opened control loop into the first memory as the target power set point, and operating the RF transmitter with the opened control loop for each of one or more additional data rates or constellation types while measuring the spectral leakage and distortion metrics. For each additional data rate or constellation type, the method includes determining a new power control value and a new power level value when a new maximum desired power level is achieved for a corresponding data rate or constellation type when either one of the spectral leakage metric and the distortion metric is maximized, storing an output scale factor for the corresponding data rate or constellation type in the second memory, where the output scale factor represents a differential between the first power control value and the new power control value, and storing an input scale factor for the corresponding data rate or constellation type in the third memory, where the input scale factor represents a differential between the target power set point and the new power level value.

The RF transmitter may include a fourth memory for storing an initial power control value and an accumulator used to converge the control loop during closed loop operation. The initial power control value is copied to the accumulator during power up or reset. In this case, the method may further include storing a predetermined percentage of the first power control value into the fourth memory as the initial power control value.

BRIEF DESCRIPTION OF THE DRAWINGS

A better understanding of the present invention can be obtained when the following detailed description of exemplary embodiments is considered in conjunction with the following drawings, in which.

DETAILED DESCRIPTION OF EMBODIMENT(S) OF THE INVENTION

Figure 1:
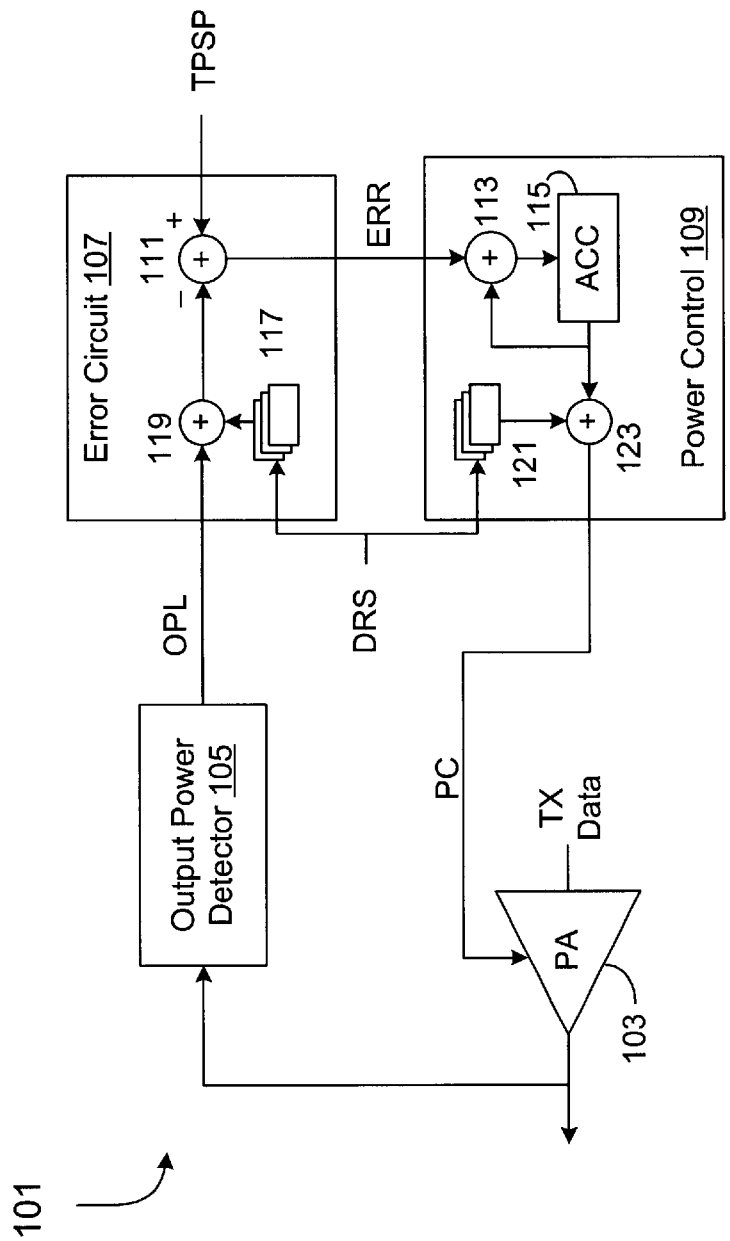
FIG. 1 is a block diagram of an exemplary transmit power control loop according to an embodiment of the present invention.

FIG. 1 is a block diagram of an exemplary transmit power control loop 101 according to an embodiment of the present invention. Transmit circuitry (not shown) develops a Transmit (TX) Data signal that is applied to the input of a power amplifier (PA) 103 for transmission in a wireless medium. An output power detector 105 is coupled to detect the output power level of the PA 103 and for generating a corresponding output power level (OPL) value indicative thereof. The OPL value is provided to an error circuit 107, which compares (or otherwise combines) the OPL value with a target power set point value TPSP and generates a corresponding error value ERR. In one embodiment, the error circuit 107 includes a summing junction 111 that subtracts the OPL value from the TPSP value to provide the ERR value. The ERR value is provided to a power control circuit 109, which uses the ERR value to adjust a power control signal PC. In one embodiment, the power control circuit 109 includes a summing junction 113 and an accumulator 115 that collectively adjusts a power control value stored within the accumulator 115 by the ERR value. In the embodiment shown, the power control value in the accumulator 115 is added to the ERR value and the result is stored back into the accumulator 115. The power control value in the accumulator 115 is used to derive the PC signal, which is provided to a gain input of the PA 103 to control the output power level of the PA 103 to close the loop.

The transmit power control loop 101 is used to control output power for a plurality of data rates and corresponding constellation types in accordance with selected modulation schemes. The TPSP value is determined by a calibration procedure or the like and may be the target value for one of the constellation types. For example, the transmitter including transmit power control loop 101 is operated with the selected constellation type and the output power is measured to identify the maximum power level achievable that either meets a maximum allowable distortion level or a maximum level of spectral leakage into adjacent channels. The TPSP value used for one constellation type, however, would not achieve optimal results for the other constellation types used for different data rates because the PA 103 is a non-linear device. In particular, the relative change applied at the input of the PA 103 is not linear to the relative change at the output of the PA 103 for different constellation types. To resolve this problem, input scale factors are applied to compensate power differentials for each of the different constellation types as they vary at the output of the PA 103. Also, separate output scale factors are applied to compensate power differentials for each of the different constellation types as they vary at the input of the PA 103. In this manner, input and output correction factors are applied to achieve optimal performance for each constellation type.

An input normalization adjust circuit is provided that represents an adjustment to or offset from the output power level value (or of the TPSP value) for one or more different constellation types. In the embodiment shown, a memory 117 stores one or more input scale factor values that are employed to provide input normalization to the control loop for a corresponding one or more different constellation types used for different data rates. A Data Rate Select (DRS) signal selects an input scale factor value from the memory 117 based on the applicable data rate and applies the selected value to one input of a summing junction 119, which receives the OPL value at its other input. The input scale factor and OPL values are added together, and the sum is applied to an inverting input of the summing junction 111, which subtracts the scale factor and OP sum from the TPSP value to determine the ERR value.

An output normalization circuit is also provided that represents an adjustment to or offset from the power control value for one or more different constellation types. In the embodiment shown, a memory 121 stores one or more output scale factor values that are employed to provide output normalization to the control loop for the different constellation types used for different data rates. The DRS signal selects an output scale factor value from the memory 121 based on the applicable data rate and applies the selected value to one input of a summing junction 123, which receives the power control value from the accumulator 115 at its other input. The selected output scale factor and power control values are added together by the summing junction 123, which generates an adjusted power control value used to derive the PC signal.

In this manner, it is appreciated that a single tracking loop is used to adjust transmit power for all constellation types associated with all data rates and the corresponding output power levels. Convergence time is very rapid since it does not depend on any determined transmit power at a particular data rate. Tracking updates that are generated for one data rate level or constellation type are applicable for and used by all constellation types and data rate levels allowing more frequent adjustment. The same loop is applied with different input and output scaling factors for each constellation type. Less memory or storage is required for the scaling factors than would otherwise be required to maintain separate control loops for each constellation type and data rate.

Figure 2:
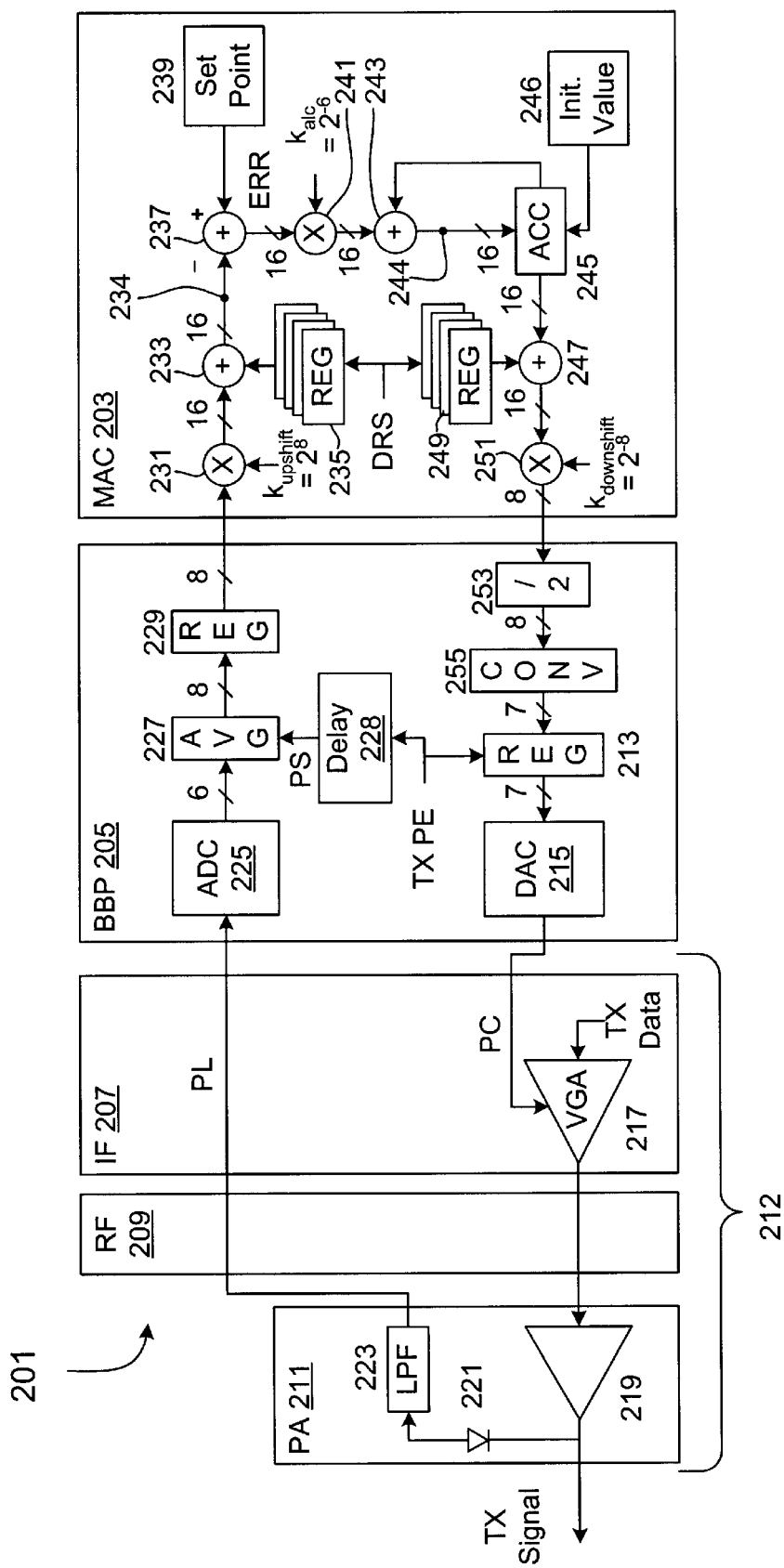
FIG. 2 is a block diagram of an exemplary wireless RF transceiver implemented according to a more specific and practical embodiment of the present invention.

FIG. 2 is a block diagram of an exemplary wireless radio frequency (RF) transceiver 201 implemented according to a more specific and practical embodiment of the present invention. The primary portions of the RF transceiver 201 are represented, including a MAC 203, a Baseband processor (BBP) 205, an Intermediate Frequency (IF) section 207, an RF section 209, and a power amplifier (PA) section 211, although only the details associated with transmit power control are included. The IF section 207, the RF section 209 and the PA section 211 collectively form an output portion 212 that generally operates in the analog domain and includes a power amplifier and output power detector as further described below. For purposes of data transmission, the MAC 203 is a control device that generally operates to receive data from an underlying system or device and to control data flow operations. The BBP 205 generally operates to perform digital data operations including data encoding and modulation and to convert from digital to analog format. The IF and RF sections 207, 209 convert an analog transmit signal from a Baseband frequency into an appropriate RF frequency suitable for transmission within a selected RF band. The PA 211 transmits the RF signal onto the wireless medium at a selected power level.

In the embodiment shown, output power control is performed by a variable gain amplifier (VGA) 217 in the IF section 207. The RF transceiver 201 may be used to communicate with one or more similar wireless devices across a wireless medium, such as within a wireless local area network (WLAN) or the like. Although the present invention is illustrated for use in a WLAN device in exemplary embodiments, it is understood that the present invention applies to any radio or wireless communication device and is not limited to WLAN applications. Receive operations may also be performed, but are not further described.

The RF transceiver 201 may be used by any type of device to incorporate wireless communication capabilities, such as a wireless access point (AP), any type of computer or computer system (e.g., personal computers, laptop computers, desktop computers, etc.), printing devices including any type of printer technology, personal digital assistants (PDAs) or the like, scanners, fax machines, etc. The RF transceiver 201 may be configured as a plug-in peripheral or expansion card that plugs into an appropriate slot or interface of a computer system, such as a Personal Computer Memory Card International Association (PCMCIA) card or PC Card or may be implemented according to any type of expansion or peripheral standard, such as according to the peripheral component interconnect (PCI), the Industry Standard Architecture (ISA), the Extended-ISA (EISA) standard, etc. Mini PCI cards with antennas embedded in displays are also contemplated. Self-contained or standalone packaging with appropriate communication interface(s) is also contemplated, which is particularly advantageous for APs. The RF transceiver 201 may be implemented as a separate unit with serial or parallel connections, such as a Universal Serial Bus (USB) connection or an Ethernet interface (twisted-pair, coaxial cable, etc.), or any other suitable interface to the device. Other types of wireless devices are contemplated, such as any type of wireless telephony device including cellular phones.

In a more specific embodiment, the RF transceiver 201 is implemented according to the IEEE 802.11a standard operating at approximately 5 Gigahertz (GHz) for use within a WLAN. As described previously, the IEEE 802.11a standard defines data rates of 6, 9, 12, 18, 24, 36, 48 and 54 megabits per second (Mbps) in the 5 GHz band employing orthogonal frequency division multiplexing (OFDM). OFDM is a multi-carrier modulation technique in which data is carried on a plurality of "tones" or "sub-carriers" associated with a multi-carrier signal. Data is incorporated on each data tone using a selected modulation scheme, such as Binary Phase Shift Keying (BPSK), Quadrature PSK (QPSK), 16 Quadrature Amplitude Modulation (QAM), and 64 QAM. Each of the modulation schemes employs a corresponding constellation type with 2, 4, 16 or 64 constellation points, respectively, for modulating 1, 2, 4 or 6 bits, respectively. The data rate is determined, in part, by the modulation scheme and corresponding constellation type used for data. For example, BPSK is used for 6 or 9 Mbps, QPSK is used for 12 or 18 Mbps, 16 QAM is used for 24 or 36 Mbps, and 64 QAM is used for 48 or 54 Mbps. Different data rates may be achieved for a given constellation type by using different encoding techniques employing different levels of redundant information. A constellation point is selected for each bit group according to the selected constellation type and data rate, and each tone is modulated with an amplitude and phase according to the selected constellation point. It is appreciated, however, that the principles of the present invention may be applied to any type of RF device employing multiple data rates and constellation types in which it is desired to optimize transmit power for each data rate.

The transmit power control loop 101 was described as having a different offset for each data rate. The RF transceiver 201 is implemented according to the IEEE 802.11a standard in which two different data rates are defined for each constellation type as previously described. The higher data rate for each constellation type has less redundancy and is therefore less robust as compared to the lower data rate. If in band distortion (EVM) is the limiting requirement and it is specified by data rate as opposed to constellation type, it is possible to transmit the lower data rate at a higher power level and still be compliant. This is allowed in the IEEE 802.11a standard since the EVM is specified differently for the two data rates sharing the same constellation. In the RF transceiver 201, however, the difference is relatively small. However, if the transmit power limiting factor is spectral leakage into adjacent channels which is specified independently of data rate, similar channel leakage occurs for data rates sharing a constellation type, since the encoded waveforms for the two data rates are very similar. The RF transceiver 201, therefore, may employ a single offset for both data rates using the same constellation type. It is understood that the principles of the present invention apply in the same manner.

In operation, the MAC 203 initiates assertion of a transmit packet enable (TX PE) signal, which locks a transmit control value within a 7-bit register 213 of the BBP 205. The number of bits is arbitrary and determined according to design specifications of specific configurations. The transmit control value is converted to an analog power control (PC) signal by a digital to analog converter (DAC) 215, which asserts the PC signal to a gain input of the VGA 217. The VGA 217 amplifies a Transmit (TX) Data signal applied to its input by a gain controlled by the PC signal, and the amplified signal is processed through the RF section 209 and provided to the input of an output power amplifier 219 within the PA 211. The output power amplifier 219 asserts a corresponding output transmit (TX) signal onto the wireless medium via an antenna (not shown) as known to those skilled in the art. It is appreciated that the PC signal ultimately determines the output power level of the transmit signal asserted by the output power amplifier 219.

The output power level of the output power amplifier 219 is measured by a power detector 221 and filtered by a low pass filter (LPF) 223, such as a resistor-capacitor (RC) filter or the like. A filtered power level (PL) signal is converted to digital format by an analog to digital converter (ADC) 225 within the BBP 205. A 6-bit power level signal from the ADC 225 is applied to an average (AVG) block 227, which samples the power level signal a predetermined number of times upon assertion of a power sample (PS) signal. The PS signal is asserted by a delay block 228 after a predetermined fixed delay period after assertion of the TX PE signal. The delay inserted by the delay block 228 ensures that any transient signals generated by the VGA 217 and the output power amplifier 219 are substantially attenuated to enable more accurate output power measurement. In one embodiment, the AVG block 227 takes 8 samples during an 8 microsecond time period during a Long Sync interval. Simulations have shown relatively low measurement variance during the Long Sync portion of each packet. The AVG block 227 averages the samples and writes an 8-bit power level value into an 8-bit register 229 within the BBP 205. The conversion from 6 to 8 bits represents a gain of 4 through the AVG block 227 and also enables a more accurate averaged reading.

The output of the register 229 is provided to one input of a two-input multiplier 231, which multiplies the power level value by a predetermined gain $k_{upshift}$. In the embodiment shown, the multiplier 231 operates to shift the power level value by a certain number of bits in order to enable higher accuracy level operation for the MAC 203. In one embodiment, for example, 8 shifts are applied for a gain of $2^8$ resulting in 16-bit values processed through the MAC 203. The multiplier 231 provides its output to one input of a two-input summing junction 233, which operates using signed binary numbers, such as two's complement or the like, to enable appropriate addition (or subtraction) of positive or negative numbers. The other input of the summing junction 233 receives an input power scale factor from a selected one of a plurality of programmed registers 235. Each register 235 stores a corresponding input power scale factor or correction factor for each constellation type employed by the RF transceiver 201. The registers 235 are selected by a Data Rate Select (DRS) signal indicative of the particular data rate used for a given transmitted packet. The DRS signal may be generated by the MAC 203 or received from another device. It is noted that a different register 235 is provided to store a corresponding correction factor for each constellation type, so that different data rates employed for a given constellation type use the same correction factor. For example, if the DRS signal indicates a data rate of either 12 or 18 Mbps associated with the QPSK modulation scheme and constellation type, the same register 235 storing the corresponding correction factor is selected.

The output of the summing junction 233 is provided to one input of another two-input summing junction 237, which receives a Set Point value from a programmed memory or register 239 at its other input. The summing junction 237 operates to subtract the output of the summing junction 233 from the Set Point value for purposes of generating an error value ERR. The summing junction 237 preferably operates using signed binary numbers, such as two's complement or the like, to enable correction in both positive and negative directions. The ERR value represents the differential between the measured power level, as adjusted by a selected correction factor, and the target power level as determined by the Set Point value stored in the register 239. Although the ERR value might be used directly in the loop with appropriate bit weighting conversion, it is desireable to scale it down by an automatic loop control (alc) gain factor $k_{alc}$, which is $2^{-6}$ in the embodiment shown. Thus, the ERR value and the $k_{alc}$ factor are provided to respective inputs of a two-input multiplier 241, which provides its output to one input of a two-input summing junction 243. The other input of the summing junction 243 receives an output of an accumulator (ACC) register 245, and the result is re-stored back into the accumulator 245. In this manner, the value stored in the accumulator 245 is continuously (or periodically) updated by a scaled error value representing a differential between measured power and target power. The $k_{alc}$ factor is relatively arbitrary, may be determined experimentally and serves to stabilize the control loop by increasing the correction time factor.

The accumulator 245 stores the power control value used to determine the gain of the VGA 217 and thus the output power level. A memory 246 is optionally provided to store an initial power control value that is copied to the accumulator 245 upon power up or reset, as further described below. The power control value is adjusted by a selected output power scale factor or correction factor from one of a plurality of programmed registers 249. Each register 249 stores a corresponding output power scale factor or correction factor for each constellation type employed by the RF transceiver 201. The registers 249 are selected by the DRS signal in a similar manner as described above for the registers 235. Again, a different register 249 is provided to store a corresponding correction factor for each constellation type employed. A two-input summing junction 247 adds a selected output power scale factor with the power control value from the accumulator 245 and provides the resulting sum to one input of a two-input multiplier 251. The summing junction 247 operates using signed binary numbers, such as two's complement or the like, to enable appropriate addition (or subtraction) of positive or negative numbers. The multiplier 251 multiplies the output of the summing junction 247 by a predetermined gain or down shift factor $k_{downshift}$ which is 2–8 in the embodiment shown. It is noted that actual shifts or multiplications are not necessary and that the data may simply be applied to appropriate portions of registers to achieve the desired result. The multiplier 251 generally performs the opposite function as the multiplier 231 to reduce the number of bits back down to 8 bits from 16 bits for processing by the BBP 205. The 8-bit output of the multiplier 251 within the MAC 203 is provided to a divide-by-two block 253 and then to a binary conversion block 255 to convert the signed binary value to an unsigned value and to reduce the number of bits for storage in the 7-bit register 213.

Analysis and principles of operation of the RF transceiver 201 are similar to those of the transmit power control loop 101. The registers 235 and 249 correspond to the memories 117 and 121, respectively, the Set Point value corresponds to the TPSP value and the accumulator 245 corresponds to the accumulator 115. Compensation for constellation type and power output level is provided by correction factors applied at the input and output of the set point error measurement, scaling, and accumulator. The illustrated architecture enables the maintenance of one tracking loop. With one loop accumulator using during normal, closed-loop operation, every packet contributes to the loop adaptation regardless of data rate. Less frequently active data rates are still controlled by the most recent radio state information. Four separate correction factors may be used, including one for each of the four constellation types (e.g., BPSK, QPSK, 16 QAM and 64 QAM), where the Set Point value is arbitrarily chosen and offsets are used for the applicable data rate. In a more practical embodiment, only three offset pairs are necessary if the Set Point value is chosen to be the target power level for one constellation type (e.g., BPSK) so that the other three are additional power back off corrections relative to the nominal rate. Any one of the constellation types may chosen to be the "nominal" rate since the correction factors are relative values thereof.

Figure 3:
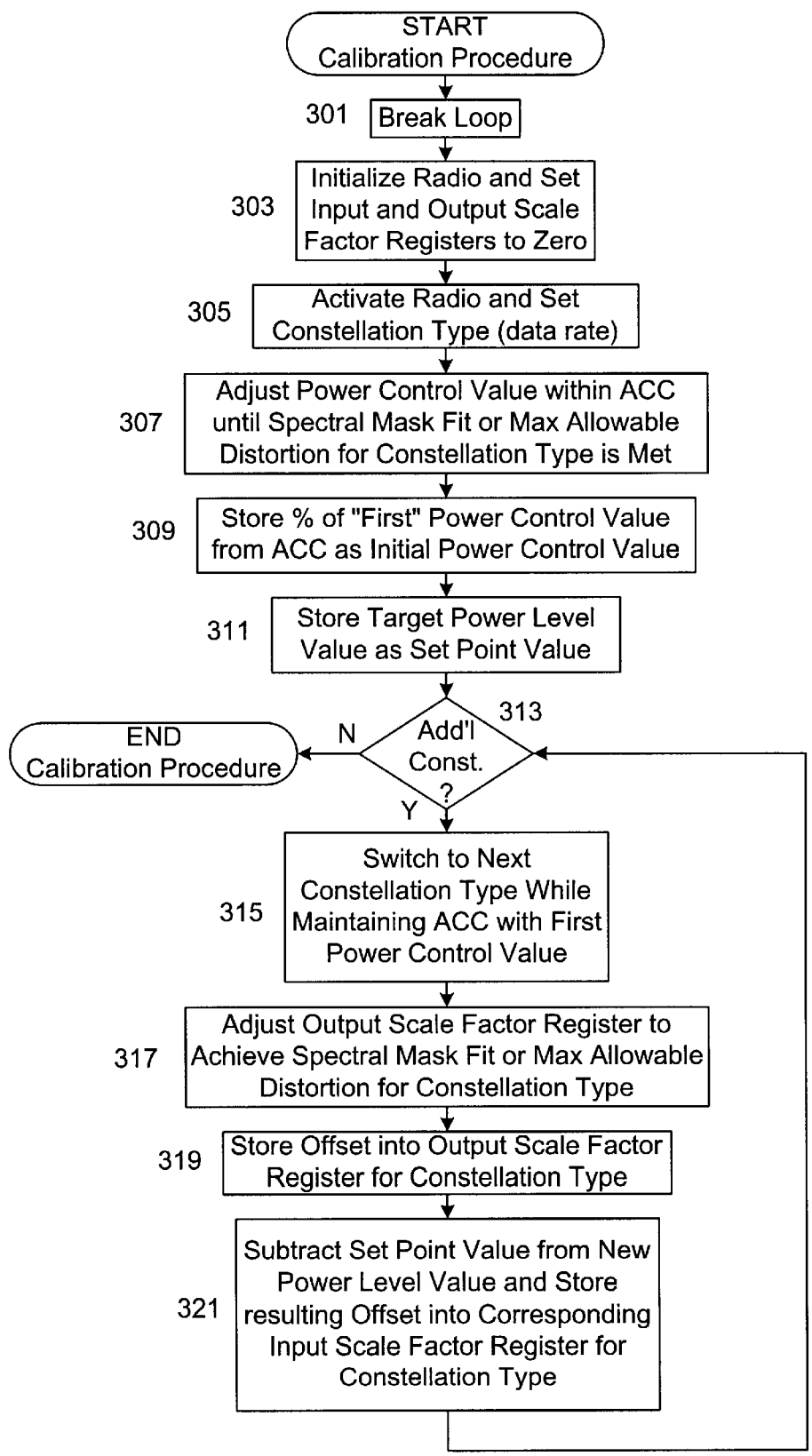
FIG. 3 is a flowchart diagram illustrating an exemplary calibration procedure for the RF transceiver of FIG. 2 to achieve optimal power level performance for each of multiple constellation types.

FIG. 3 is a flowchart diagram illustrating an exemplary calibration procedure for the RF transceiver 201 to achieve optimal power level performance at each of multiple constellation types. Calibration may occur once for a particular radio type and power amplifier circuit to be used in all future radios, or at radio manufacture for each specific radio. Calibration may be incorporated on the radio and performed periodically. Such on-board calibration is similar to the procedure described herein where the radio further includes distortion monitoring and adjacent channel power leakage measurement circuitry as well as control circuitry to conduct the calibration on a periodic basis. The calibration procedure described herein is performed with external measurement equipment, where the RF transceiver 201 is placed in a controlled environment including external calibration equipment used to detect and measure transmitted signals from the RF transceiver 201. The calibration equipment measures in-channel output distortion and adjacent-channel spectral leakage interference. For each constellation type, it is desired to determine the maximum transmit power possible without exceeding predetermined maximum distortion levels or interference (spectral leakage) levels, where either the distortion parameter or the interference parameter may be the limiting factor for any given modulation type. For example, the BPSK modulation scheme is relatively robust and more tolerant of distortion than higher data rate modulation schemes, so that the power may be boosted to relatively high levels in which the interference parameter is more likely to be the limiting factor. Higher modulation schemes, however, such as 64 QAM, are more susceptible to distortion so that maximum distortion levels are likely to be reached before significant spectral leakage levels occur.

At a first block 301, the control loop is broken at a convenient location in order to measure maximum power level and to suspend loop operation. For the RF transceiver 201, a location at 244 is chosen as a convenient point to break the loop. At next block 303, the RF transceiver 201 is initialized and the input and output scale factor registers 235 and 249 are all set to zero. At next block 305, the RF transceiver 201 is activated using any one of the constellation types (and corresponding modulation schemes and data rates) as the nominal type, such as BPSK, although it is understood that any of the constellation types may be used for nominal measurement. At next block 307, a power control value in the accumulator 245 is adjusted (increased) until either spectral mask fit (leakage or interference) or maximum allowable distortion is achieved for the chosen nominal constellation type as measured by the calibration equipment. The resulting power control value is referred to as the "first" power control value in the flowchart. It is noted that the actual accumulator 245 may or may not be used, but nonetheless the power control value is injected at or near that point in the loop. Once either the distortion or interference metric is achieved, the resulting "first" power control value in the accumulator 245 corresponds to the maximum power level for the selected constellation type.

At next block 309, the "first" power control value may optionally be stored in the memory 246 as the initial value of the power control value during power up or reset of the RF transceiver 201. It is noted, however, that it may not be desired to start the RF transceiver 201 using an initial power control value that corresponds to the maximum power level. Alternatively, therefore, a predetermined percentage of the first power control value, such as 90% or the like, may be used as the initial power control value. In this manner, the RF transceiver 201 begins operating after power up or reset at a slightly lower power level and ramps up to the maximum power level as controlled by the loop during normal operation. The initial value stored in the memory 246 is copied to the accumulator 245 at startup or reset of the RF transceiver 201 to initiate normal operation. At next block 311, a target power level value at an output of the broken loop prior to the summing junction 237 corresponding to the maximum power level for the nominal constellation type is programmed into the memory 239 as the Set Point value. An exemplary measurement point in the loop of the RF transceiver 201 is the location at 234 between the summing junctions 233 and 237. The Set Point value stored in the memory 239 is used thereafter for normal loop operations.

Operation proceeds to next query block 313 in which it is determined whether any additional constellation types are to be calibrated. If the RF transceiver 201 is only operated using the nominal constellation type (or at a nominal data rate), then operation is complete. Otherwise, if additional constellation types are to be considered, then operation proceeds to next block 315 in which the RF transceiver 201 is switched to a next applicable constellation type (e.g., QPSK) and operated at a data rate using the newly selected constellation type while the accumulator 245 is maintained at the same "first" power control value determined for the nominal constellation type. At next block 317, the output scale factor register 249 corresponding to the selected constellation type is adjusted to adjust the power control value to achieve either the interference metric or distortion metric for the current constellation type as measured by the calibration equipment. It is noted that the actual register 249 may or may not be used but in either case, an offset value relative to the nominal value the accumulator 245 is injected into an input of the summing junction 247 to achieve an adjusted power control value at the output of the summing junction 247. At next block 319, once the maximum power level is determined, the corresponding offset value (correction factor) is stored in the corresponding output scale factor register 249. The stored value represents a differential between the nominal or first power control level and the new power control level determined for the current constellation type. In this manner, the newly stored output normalization scale factor is used during normal operation of the loop when the DRS signal indicates a data rate that corresponds to the currently selected constellation type to adjust the power control value relative to the nominal constellation type.

It is noted that the offset may be determined using the accumulator 245 alone or simply inserting new power control levels into the summing junction 246 or the multiplier 251, determining a new power control value, taking the difference between the new power control value and the "final" power control value for the nominal constellation type and storing the difference as the offset value in the corresponding register 249. The resulting value is the same in any case. It is appreciated that if the nominal constellation type corresponds to lower (or the lowest) data rates, such as BPSK, then the new constellation type used for higher data rates will most likely have a lower target power control value. In this manner, the correction factor value stored in the corresponding register 249 will most likely be a negative number to reduce the output power level value in the accumulator 245 to adjust output power employed for the higher rate constellation type.

At next block 321, the Set Point value is compared with, or otherwise subtracted from, the new power level value measured at point 234 and the resulting offset is stored into the input scale factor register 235 corresponding to the selected constellation type. In this manner, the newly stored output normalization scale factor is used during normal operation of the loop when the DRS signal indicates a data rate that corresponds to the currently selected constellation type to adjust the measured power level relative to the nominal constellation type. It may be viewed that the output normalization scale factor is an adjustment of the Set Point value for a different constellation type relative to the nominal constellation type. In any case, the correction factors stored in the corresponding registers 235 and 249 allow a single loop to be used to achieve optimal or maximum power output for either constellation type employed. Operation loops back to block 313 to determine if there are any additional constellation types requiring calibration. Operation loops between blocks 313 to 321 to calibrate each constellation type by programming the registers 235 and 249 with corresponding correction factor values in a similar manner as described above. After each constellation type is calibrated for the RF transceiver 201, operation terminates and calibration is complete.

It is noted that the above-described calibration procedure uses one of the constellation types as a nominal type for determining the Set Point value programmed into the memory 239. The corresponding input and output offset values programmed into the register memories 235, 249, respectively, for the nominal constellation type are either not used or are zero since adjustment is not necessary. The calibration procedure may be slightly modified by programming the memory 239 with an arbitrary nominal Set Point value that is within or near the range of power level values for each of the constellation types so that none of the constellation types are considered nominal. Instead, the registers 235, 249 for storing the input and output offset values are programmed with appropriate offsets using the blocks 315–321 for each of the applicable constellation types. The calibration procedure and the RF transceiver 201 are only slightly modified if a different offset is desired for each data rate rather than constellation type. References to "constellation type" in the flowchart are replaced with "data rate" references and the loop between blocks 313–321 are repeated for each additional data rate rather then constellation type. The DRS signal is sufficient for indicating the particular data rate during operation for selecting the appropriate offset.

It is appreciated that a single loop with a single Set Point value is used for all constellation types and/or data rates. The Set Point value is either set arbitrarily or corresponds to one nominal constellation type or data rate. In either case, the registers 235 and 249 are programmed with output and input normalization scale factors, respectively, to adjust the scales of the loop for each constellation type or data rate during normal operation. Convergence time is relatively rapid regardless of data rate since it does not depend on the transmit power or data rate of any particular packet. A single loop throttle (e.g., multiplication of the ERR value by a scaling factor $k_{alc}$) may be employed to control convergence time and increase loop stability. Tracking updates applied to the single loop accumulator apply to all data rates and/or constellation types so that changing data rates, even to a sparsely used data rate, does not significantly effect loop operation. Loop operation remains relatively stable regardless of data rate or data rate switching.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

What is claimed is:

1. A power controller for a wireless transmitter that operates using a plurality of different data rates, the transmitter including a variable output power amplifier having a gain input, the power controller, comprising:

an output power detector that provides an output power level value indicative of output power;

an error circuit that compares the output power level value with a target power value and that asserts an error value indicative thereof;

a power control circuit that asserts a power control signal based on a power control value for controlling the gain input of the output power amplifier, the power control circuit regulating the power control value based on the error value;

an input normalization circuit that selectively offsets the output power level value using one or more input scale values selected by a data rate select signal indicative of data rate; and an output normalization circuit that selectively offsets the power control value using one or more output scale values selected by the data rate select signal.

2. The power controller of claim 1, wherein the target power level is based on a first data rate.

3. The power controller of claim 2, wherein selected input and output scale values are both zero when the data rate select signal indicates the first data rate.

4. The power controller of claim 1, further comprising:
the input normalization circuit offsetting the output power level value based on a selected one of a plurality of input scale values, each corresponding to one of the plurality of data rates; and
the output normalization circuit offsetting the power control value based on a selected one of a plurality of output scale values, each corresponding to one of the plurality of data rates.

5. The power controller of claim 4, wherein the plurality of data rates are achieved using a plurality of modulation schemes including BPSK, QPSK, QAM 16 and QAM 64.

6. The power controller of claim 1, wherein the output power detector further comprises:
an average circuit that measures and averages a plurality of output power levels to generate the output power level value.

7. The power controller of claim 1, further comprising:
the input normalization circuit including a first memory that stores a plurality of input scale values and a first summing junction that combines the output power level value with one of the plurality of input scale values as selected by the data rate select signal; and
the output normalization circuit including a second memory that stores a plurality of output scale values and a second summing junction that combines the power control value with a selected one of the plurality of output scale values as selected by the data rate select signal.

8. The power controller of claim 1, wherein the power control circuit further comprises a single loop accumulator that adjusts the power control value by the error value for each data rate.

9. The power controller of claim 8, further comprising a regulator that scales the error value to control loop convergence timing.

10. A radio frequency (RF) communication device that includes a power control loop for controlling output power for each of a plurality of different data rates, the RF communication device comprising:
an output portion that includes a power detector and a variable output power amplifier having a gain input;
a Baseband processor that receives a power level signal from the power detector and provides a corresponding power level value and that receives a power control value and asserts a power control signal to the gain input of the variable output power amplifier; and
a control device that receives and compares an adjusted power level value with a predetermined set point value and generates a corresponding error value and that adjusts the power control value based on the error value, the control device using a data rate signal indicative of a selected data rate, the control device including:
an input normalization adjust circuit that includes a first memory that stores one or more input adjustment values selected by the data select signal for adjusting the power level value; and
an output normalization adjust circuit that includes a second memory that stores one or more output adjustment values selected by the data select signal for adjusting the power control value.

11. The RF communication device of claim 10, the plurality of data rates achieved using a plurality of different constellation types, wherein the first and second memories store a plurality of input and output adjustment values, respectively, and wherein each corresponding pair of input and output adjustment values correspond to a selected constellation type.

12. The RF communication device of claim 11, wherein the set point value is based on a first constellation type and wherein a corresponding pair of input and output adjustment values are zero.

13. The RF communication device of claim 1, wherein the plurality of different constellation types correspond to BPSK, QPSK, QAM 16 and QAM 64.

14. The RF communication device of claim 10, wherein the first and second memories store a plurality of input and output adjustment values, each pair of input and output adjustment values is employed to maximize output power when operating at corresponding data rates.

15. The RF communication device of claim 10, wherein the first and second memories each comprises a plurality of programmable registers.

16. The RF communication device of claim 10, wherein the variable output power amplifier comprises a variable gain amplifier having a gain input and a data output and a power amplifier having a data input, wherein the data output of the variable gain amplifier is coupled to the data input of the power amplifier.

17. The RF communication device of claim 10, wherein the control device comprises:
a first summing junction that adds a power level value with a selected input adjustment value and that provides an adjusted power level value; and
a second summing junction that compares the adjusted power level value with the set point value and that generates the error value.

18. The RF communication device of claim 17, wherein the control device includes a loop regulator that scales the error value to control convergence timing of the power control loop.

19. The RF communication device of claim 18, wherein the control device includes an accumulator that stores the power control value and a third summing junction that adjusts the power control value in the accumulator by the scaled error value.

20. The RF communication device of claim 19, wherein the control device includes a fourth summing junction that adds the adjusted power control value from the accumulator and a selected output adjustment value and that provides an adjusted power control value.

21. The RF communication device of claim 20, wherein the control device includes a third memory that stores an initial power control value that is copied into the accumulator upon power up or reset.

22. The RF communication device of claim 21, wherein the initial power control value is determined by a percentage of a measured power control value that achieves a maximum power level for a nominal data rate.

23. The RF communication device of claim 10, wherein the control device comprises a media access control (MAC) device.

24. The RF communication device of claim 10, wherein the Baseband processor includes an averaging circuit that samples the power level signal a plurality of times and that averages the samples.

25. A method of calibrating a radio frequency (RF) transmitter to maximize output power for each of a plurality of different data rates, the RF transmitter including a single power control loop that converges using a target power set point in a first memory during normal operation for each data rate, the RF transmitter further including a second memory for storing a plurality of output scale factors used to adjust a power control value and a third memory for storing a plurality of input scale factors used to adjust a power level value, the input and output scale factors selected by a data rate signal indicative of operating data rate, said method comprising:

opening the control loop during calibration;

operating the RF transmitter with the opened control loop using a selected first data rate while measuring output power metrics including a spectral leakage metric and a distortion metric;

applying and adjusting a power control value at an input of the opened control loop until a maximum desired power level is achieved for the data rate when either one of the spectral leakage metric and the distortion metric is maximized, resulting in a first power control value;

storing a power level value at an output of the opened control loop into the first memory as the target power set point; and operating the RF transmitter with the opened control loop for each of one or more additional data rates while measuring the spectral leakage and distortion metrics, and for each additional data rate:

determining a new power control value and a new power level value when a new maximum desired power level is achieved for a corresponding data rate when either one of the spectral leakage metric and the distortion metric is maximized;

storing an output scale factor for the corresponding data rate in the second memory, the output scale factor representing a differential between the first power control value and the new power control value; and storing an input scale factor for the corresponding data rate in the third memory, the input scale factor representing a differential between the target power set point and the new power level value.

26. The method of claim 25, the RF transmitter using a plurality of different constellation types, wherein:

said operating the RF transmitter with the opened control loop using a selected first data rate while measuring output power metrics comprises operating using a selected first constellation type;

said applying and adjusting a power control value comprising applying and adjusting the power control value until a maximum desired power level is achieved for the selected first constellation type; and said operating the RF transmitter with the opened control loop for each of one or more additional data rates comprising operating the RF transmitter for each of one or more additional constellation types, including determining a new power control value and a new power level value for a corresponding constellation type, storing an output scale factor for the corresponding constellation type in the second memory, and storing an input scale factor for the corresponding constellation type in the third memory.

27. The method of claim 25, the RF transmitter including a fourth memory for storing an initial power control value and an accumulator used to converge the control loop during closed loop operation, the initial power control value copied to the accumulator during power up or reset, said method further comprising storing a predetermined percentage of the first power control value into the fourth memory as the initial power control value.

* * * * *

UNITED STATES PATENT AND TRADEMARK OFFICE
CERTIFICATE OF CORRECTION

PATENT NO. : 6,735,420 B2
DATED : May 11, 2004
INVENTOR(S) : Keith R. Baldwin

It is certified that error appears in the above-identified patent and that said Letters Patent is hereby corrected as shown below:

Column 7,
Line 6, change "OP" to -- OPL --;

Signed and Sealed this

Twenty-seventh Day of July, 2004

JON W. DUDAS
*Acting Director of the United States Patent and Trademark Office*